Nov. 3, 1925.
H. ESHELMAN ET AL
1,560,252
LEVER LOCK
Filed Oct. 11, 1924
2 Sheets-Sheet 2
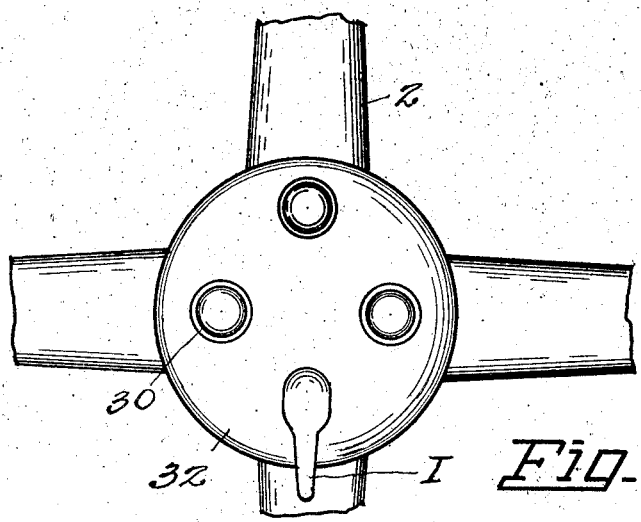
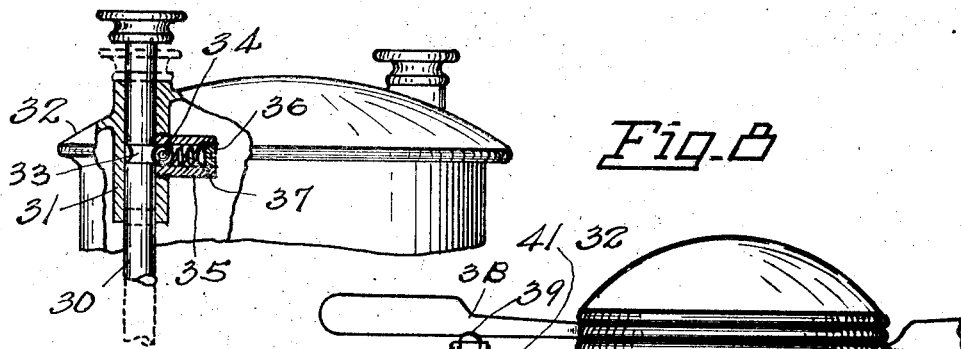
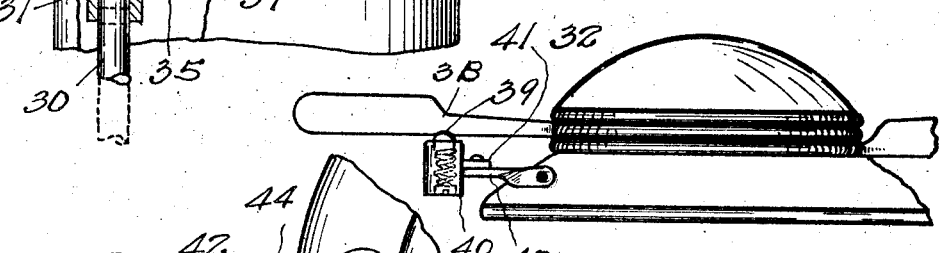
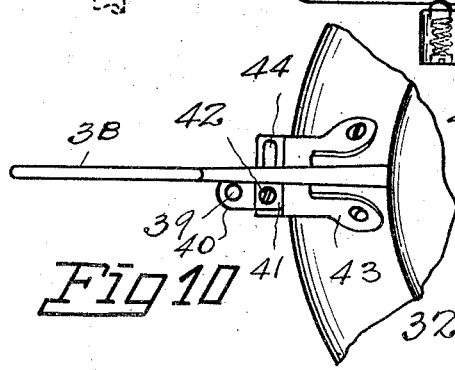
Inventor
Walter C. McLam
Herbert Eshelman
By Herbert E. Smith
Attorney Patented Nov. 3, 1925.

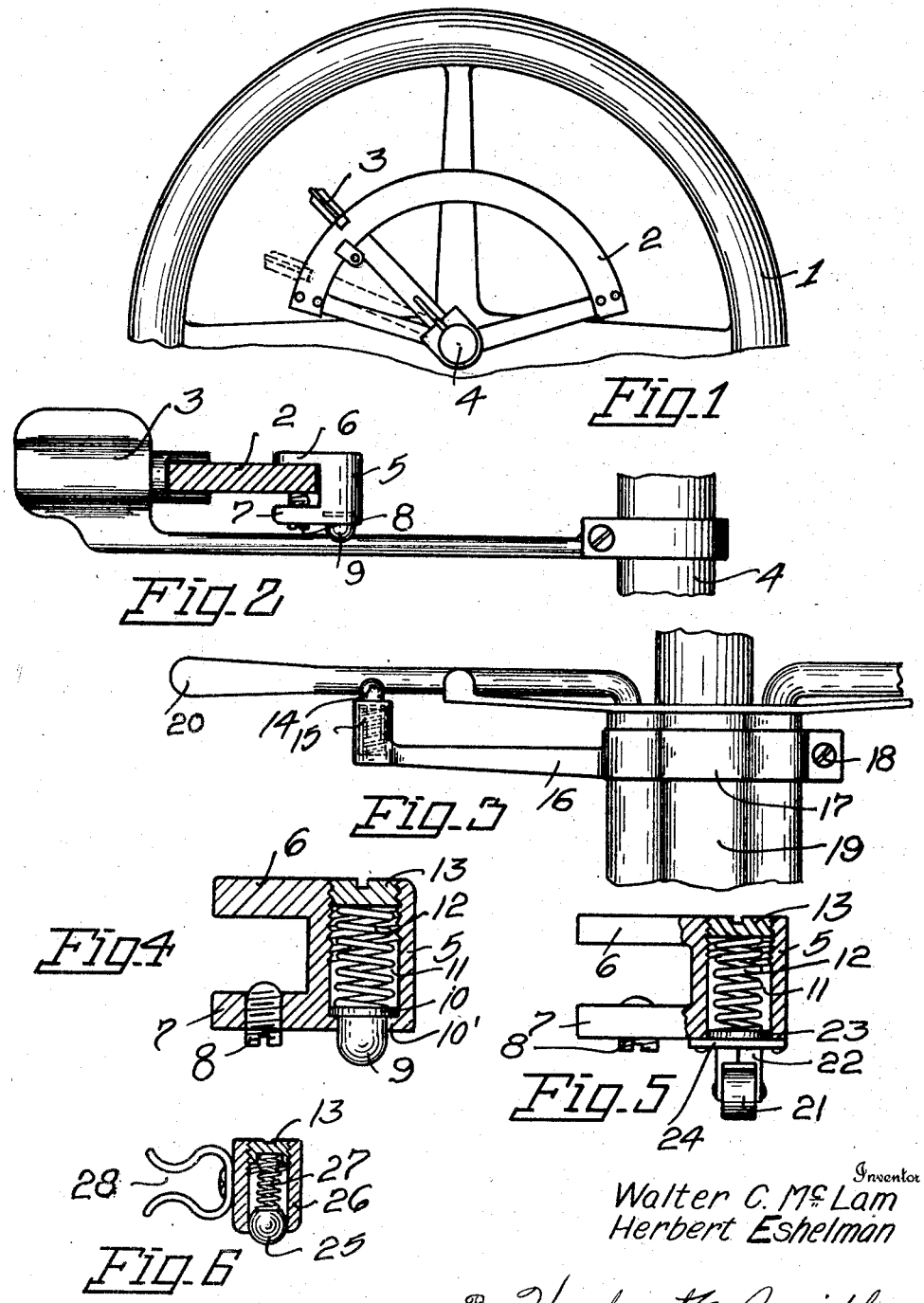

1,560,252

UNITED STATES PATENT OFFICE.

HERBERT ESHELMAN AND WALTER C. McLAM, OF SPOKANE, WASHINGTON.

LEVER LOCK.

Application filed October 11, 1924. Serial No. 743,087.

*To all whom it may concern:*

Be it known that we, HERBERT ESHELMAN and WALTER C. McLAM, citizens of the United States, residing at Spokane, in Spokane County and State of Washington, have invented certain new and useful Improvements in Lever Locks, of which the following is a specification.

Our invention relates to improvements in lever locks of the quadrant and latch type and particularly as applied to the gas control lever of automotive vehicles.

The gas control lever on automotive vehicles of substantially all standard makes is so adjusted with relation to the carbureter that when the lever is retarded this action leaves open the jet or nozzle of the carbureter in what is known as the idling position for the engine or motor. When an automotive vehicle is coasting or running down hill a constant suction of gas is present resulting in waste of the gas and filling of the motor cylinders with unburned gas during suspension of the ignition devices. Under such conditions when the spark is again turned on the motor is started with violence and the engine runs irregularly and unevenly for a short interval. In order to avoid this waste and undesirable conditions it is necessary that the entire supply of gas be cut off during this coasting movement of the car. For accomplishing this entire cut off of the gas we provide a stop device for holding the lever in idling position and also utilize in connection therewith means by which the lever may be moved past the stop or resilient latch to entirely shut off the jet in the carbureter. Under the latter conditions the automotive vehicle may coast down hill and the engine be used on compression for braking purposes by permitting air only to be drawn into the cylinders, and this air is effective in cooling the cylinders.

Our invention consists in certain novel combinations and arrangements of parts involving an attachment and a fixed support therefor in the path of movement of the gas control lever, as will hereinafter be more fully set forth and illustrated.

In the accompanying drawings we have illustrated one complete example, and several modifications thereof, of the invention wherein the parts are confined and arranged in accordance with the best modes we have so far devised for the practical application of the principles of our invention. As herein shown the device is exemplified as an attachment which may readily be applied and adjusted properly on automotive vehicles now in use, and of course the device may be manufactured as an accessory for automotive vehicles in course of their construction, before placing on the market.

Figure 1 is a view showing a portion of a steering wheel for an automotive vehicle, together with the quadrant and gas lever, and the latch device of our invention.

Figure 2 is an enlarged view showing the quadrant in section and illustrating the latch device attached thereto in relation to the gas control lever.

Figure 3 is a view showing a special form of application of the device to the Ford type of car.

Figure 4 is an enlarged detail sectional view of the latch device detached, and employing a spring pressed pin-detent.

Figure 5 is a similar view showing the use of a spring pressed roller-detent.

Figure 6 is a sectional view of another form of attaching device.

Figures 7 and 8 are respectively a top plan and side elevation partly broken away showing another adaptation of the invention.

Figures 9 and 10 are respectively a top plan view and side view of another type of lever control to which the device of our invention is applied.

Referring first to the form of the invention as illustrated in Figures 1, 2 and 4 we have shown a portion of a steering wheel 1 of an automotive vehicle, provided with the fixed quadrant plate 2, and the pivoted gas control lever 3 and connecting rod 4 therefor.

The attachment of our invention as here utilized in connection with the quadrant plate 2 includes a casing 5 of cast metal provided with a top attaching flange 6 and a complementary bottom flange 7. In attaching the device in proper adjusted position with relation to the control lever the top flange and bottom flange of the casing are slipped over and under the inner edge of the quadrant plate, and a set screw or bolt 8 carried by the lower flange is screwed tight against the under side of the quadrant plate as best shown in Figure 2. Within the hollow casting or casing 5 is carried a downwardly projecting pin 9 preferably formed with a rounded bottom end and a retaining flange 10 at its upper end to hold it in the cup 11 of the casing. The lower end of the cup is fashioned with a flanged opening 10 through which the pin is projected or pressed by a spring 12 located in the cup. A screw plug 13 closes the upper open end of the cup and is used to vary the tension of the spring on the pin 9.

In Figure 1 the lever 3 is shown in full lines in position to stop or latch the lever of an automobile in idling position as usual, while in dotted lines the lever is shown in position for entirely cutting off the supply of gas from the carbureter to the engine cylinders. Because of the resilient detent or spring pressed pin projecting in the path of movement of the lever, the latter may be pushed or snapped past the resilient detent to the dotted line position if desired. And by a reverse snapping movement the lever may be slipped past the resilient or spring pressed detent to again open the gas supply. If the extreme movement of the lever is not desired, the latter may be stopped at proper position by swinging it against the detent or pin and under such conditions the lever and detent or stop are used as in ordinary practice without interference.

It will readily be apparent that when sufficient force is applied to the lever it will slide under the spring pressed detent, lift it against the tension of the spring 12 and thus permit passage thereunder of the lever.

In Figure 3 where a Ford type of gas control lever is shown the pin 14 is pressed upwardly by a spring within the cup 15 and the cup is carried at the end of an arm 16 having a clamp collar 17 that is secured by screw 18 around the steering post 19 of the vehicle. The lever 20 may be turned or swung to ride over the detent 14 with the same results as accomplished by the lever 3 above described.

In some instances the spring pressed or resilient latch may be a roller-detent 21 as shown in Figure 5 where the roller is journaled on a pin 22 projecting downwardly from the cup 11 and provided with a flange or head 23 within the cup. A fixed retaining plate 24 at the bottom of the cup prevents the head 23 from passing from the cup and the spring 12 bears against the head with a resilient pressure to project the roller into the path of movement of the gas control lever as 3 with an action similar to the device illustrated in Figure 2.

A further modification of the invention is shown in Figure 6 where a ball detent 25 is carried at the lower restricted opening of a cup 26, and the spring 27 in the cup presses the ball downwardly to hold it in operative position in the path of movement of the gas control lever 3. In this form of the invention the casting or casing is provided with a spring clip 29 whose arms are designed to clip over and frictionally slip over and under the top and bottom faces of the quadrant plate and clasp the plate to hold the detent in operative position.

As is well known different manufacturers of automobiles use varying gas control devices. In Figures 7 and 8 the sliding type of gas control device, as used on the Oakland car is equipped with the latch or lock of our invention. The plunger 30 in the form of a round bar is illustrated in Figure 8 for the two position control of gas feed so that the idling position can be utilized as indicated in full lines, as well as have a complete shut off of gas when desired as indicated in dotted line position of the plunger or slide rod, 30. The lever 30 is reciprocable in its bushing 31 carried by the housing 32 at the top of the steering post or wheel, and said slide rod is fashioned with an annular exterior groove 33 with which the ball or detent 34 coacts to hold the slide rod in idling position as indicated. The ball is retained in a casing 35 threaded in an opening in the bushing 31 and the casing is provided with a screw plug 36 to retain the spring 37 that bears against the ball.

If the ignition is turned off, as indicated by the position of the key I in Figure 7, with the engine running and the gas feed open, the gas is wasted, causes carbon to gather in the cylinders, and also causes backfiring and a jerky pickup when the ignition is again turned on. By the use of the grooved slide rod and its detent, with the ignition turned off, the feed of gas can be controlled and retarded for idling as heretofore described.

In Figures 9 and 10 a further exemplification of the invention is shown involving means for adjusting the position of the detent. Here the control lever 38 is provided with a spring pressed detent or ball 39 carried in its casing 40. The casing is fashioned with integral adjusting plate 41 and a set screw 42 for co-action with the bracket 43 that is fixed to a suitable support as the head 32. The bracket is provided with a slot 44 for the reception of the set screw, and by means of the screw and slotted bracket the position of the detent may be changed with relation to the movement of the gas control lever, and fixed in adjusted positions to control the position of the lever when in idling position.

These various exemplifications of our invention are shown as examples of its physical embodiment and not as limitations of the invention, and in some or all respects our invention is applicable for use in connection with various forms of gas control devices or mechanisms as used on different automotive vehicles and automobiles.

Having thus fully described our invention what we claim as new and desire to secure by Letters Patent is—

1. The combination with a fixed quadrant plate and a gas control lever, of a casing having attaching flanges and a set screw for fastening to said plate, and a resilient detent carried by said casing and located in the path of movement of said lever.

2. The combination with a quadrant plate and a pivoted gas control lever, of a casing, attaching flanges and a set screw for fastening to said plate, a detent in the casing, a spring in said casing for the detent, and a screw plug for said casing.

3. The combination with an adjustable gas control device, of a support adjustable in the arc of a circle, a detent in said support, and resilient means for holding said detent in the path of movement of said device.

4. The combination with a fixed arcuate plate and a pivoted gas control lever, of an adjustable attachment for said plate and means for securing said attachment on the arcuate plate, and a resilient latch carried by said attachment in the path of movement of the control lever.

5. The combination with a fixed arcuate plate and a gas control lever, of an adjustable casing and means thereon for attachment to the arcuate portion of the plate, and a spring pressed detent carried by said casing in the path of movement of said lever.

In testimony whereof we affix our signatures.

HERBERT ESHELMAN.
WALTER C. McLAM.